(12) United States Patent
Pan et al.

(10) Patent No.: US 7,938,547 B2
(45) Date of Patent: May 10, 2011

(54) COHERENT LIGHT DISPLAY SYSTEM

(75) Inventors: Shaoher X. Pan, San Jose, CA (US); Vlad Novotny, Los Gatos, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 473 days.

(21) Appl. No.: 12/061,254

(22) Filed: Apr. 2, 2008

(65) Prior Publication Data

US 2009/0252186 A1 Oct. 8, 2009

(51) Int. Cl.
*G03B 21/28* (2006.01)
*G03B 21/26* (2006.01)
*G02B 26/08* (2006.01)
*G02B 26/10* (2006.01)
*G02B 26/12* (2006.01)

(52) U.S. Cl. ....... 353/99; 353/94; 359/201.2; 359/201.1

(58) Field of Classification Search .................... 348/771
See application file for complete search history.

(56) References Cited

U.S. PATENT DOCUMENTS

| 5,150,205 | A | 9/1992 | Um et al. | |
|---|---|---|---|---|
| 6,959,990 | B2 * | 11/2005 | Penn | 353/81 |
| 7,167,298 | B2 | 1/2007 | Pan | |
| 2007/0242344 | A1 | 10/2007 | Pan | |
| 2007/0252918 | A1 * | 11/2007 | Furuya et al. | 348/742 |

FOREIGN PATENT DOCUMENTS

JP 2004347681 A * 12/2004

* cited by examiner

*Primary Examiner* — Georgia Y Epps
*Assistant Examiner* — Ryan Howard
(74) *Attorney, Agent, or Firm* — Fish & Richardson P.C.

(57) ABSTRACT

A display system includes a coherent light source that can emit a coherent light beam, an optical component that can direct the coherent light beam to a spatial light modulator, a transport mechanism that can move the optical component to produce a movement in the coherent light beam, and a spatial light modulator having a two-dimensional array of mirrors each configured to selectively reflect the coherent light beam either toward a screen surface or away from the screen surface to form a display pixel on the screen surface. A display image is formed on the display screen by display pixels produced by the mirrors that reflect the coherent light beam toward the screen surface.

1 Claim, 5 Drawing Sheets

COHERENT LIGHT DISPLAY SYSTEM

BACKGROUND

The present disclosure relates to the packaging of spatial light modulators.

Coherent light sources such as laser devices are commonly used in display systems. When a rough surface is illuminated by a coherent laser beam, the rough surface usually exhibits a salt-and-pepper speckled appearance. The seemingly random pattern is referred as to a "speckle pattern". The speckle pattern is a random intensity pattern produced by the interference of the laser's coherent wave fronts reflected off the rough surface. When a laser is used as a light source in a display system, a speckle pattern often superimposes on the display image produced by the display system. The speckle pattern can be rather distracting to the viewer and can degrade the quality of the display image.

SUMMARY

In one general aspect, the present invention relates to a display system that includes a coherent light source that can emit a coherent light beam; an optical component that can direct the coherent light beam to a two-dimensional array of mirrors; a transport mechanism that can move the optical component to produce a movement in the coherent light beam; and a two-dimensional array of mirrors each configured to selectively reflect the coherent light beam either toward a screen surface or away from the screen surface to form a display pixel on the screen surface. A display image can be formed on the screen surface by display pixels produced by the mirrors that reflect the coherent light beam toward the screen surface. In another general aspect, the present invention relates to a display system that includes a spatial light modulator including a two-dimensional array of mirrors each configured to selectively reflect a coherent light beam either toward a screen surface or away from the screen surface to form a display pixel on the screen surface; a coherent light source that can emit the coherent light beam to illuminate the spatial light modulator; and means for moving the coherent light beam across the spatial light modulator while continuing to impinge on the spatial light modulator. A display image can be formed on the screen surface by display pixels produced by the mirrors that reflect the coherent light beam toward the screen surface.

In another general aspect, the present invention relates to a method for displaying an image. The method includes emitting a coherent light beam from a coherent light source; directing the coherent light beam with an optical component at a spatial light modulator comprising a two-dimensional array of mirrors; controlling a first portion of the mirrors in the two-dimensional array to respectively reflect the coherent light beam to form display pixels on a screen surface. A display image can be formed on the screen surface by the display pixels produced by the mirrors that reflect the coherent light beam toward the screen surface; and controlling a second portion of the mirrors in the two-dimensional array to respectively reflect the coherent light beam away from the screen surface.

Implementations of the system may include one or more of the following features. The optical component can include a beam splitter, a mirror, such as a dichroic mirror, a lens, or an optical diffuser. The movement in the coherent light beam can be in a lateral direction relative to the two-dimensional array of mirrors and have a range of 1 to 100 microns. The movement in the coherent light beam can have a range of 1 to 10 microns. The display image can be formed by the coherent light beam selectively reflected from an active area in the two-dimensional array of the light modulating elements. The coherent light beam can produce an illumination area wider than the active area such that the coherent light beam continues to impinge the active area in the two-dimensional array of the light modulating elements while moving laterally across the two-dimensional array of mirrors. The transport mechanism can produce a periodic movement in the optical component. The transport mechanism can move the optical component at a frequency higher than 60 Hz. The transport mechanism can move the optical component at a frequency higher than 1 KHz. The transport mechanism can move the optical component in a frequency range between about 1 KHz and about 10 MHz. The coherent light source can be a laser. The light beam can include a red colored light, a green colored light, or a blue colored light. The coherent light beam can illuminate the two-dimensional array of mirrors at an incident angle, wherein the incident angle can be substantially unchanged by the movement in the coherent light beam. The display system can further include a projection system configured to project a reflected light beam from the two-dimensional array of mirrors to form a display image on the screen surface. The two-dimensional array of mirrors can include an array of tiltable mirror plates having reflective surfaces configured to reflect the light beam to form the display image on the screen surface. At least one of the mirrors can include a tiltable mirror plate having a reflective surface configured to reflect the light beam to form the display image on the screen surface. The display system can further include a controller configured to produce an electrostatic force to tilt the mirror plate to an "on" position at which the mirror plate reflects the coherent light beam to form the display image on the screen surface. At least one of the mirrors can include an electrode on the substrate, wherein the mirror plate comprises a conductive portion. The controller can produce a voltage between the electrode and the conductive portion to produce the electrostatic force on the mirror plate. The despeckling can be used with passive light modulating spatial light modulators that use one or just a few lasers to produce each color in an image.

Various implementations of the methods and devices described herein may include one or more of the following advantages. The disclosed systems and methods can improve the viewing quality of display images produced by display systems using coherent light sources. Furthermore, disclosed systems and methods are generally applicable instead of limited to a specific type of spatial light modulator. Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles, devices and methods described herein.

DETAILED DESCRIPTION

Figure 1:
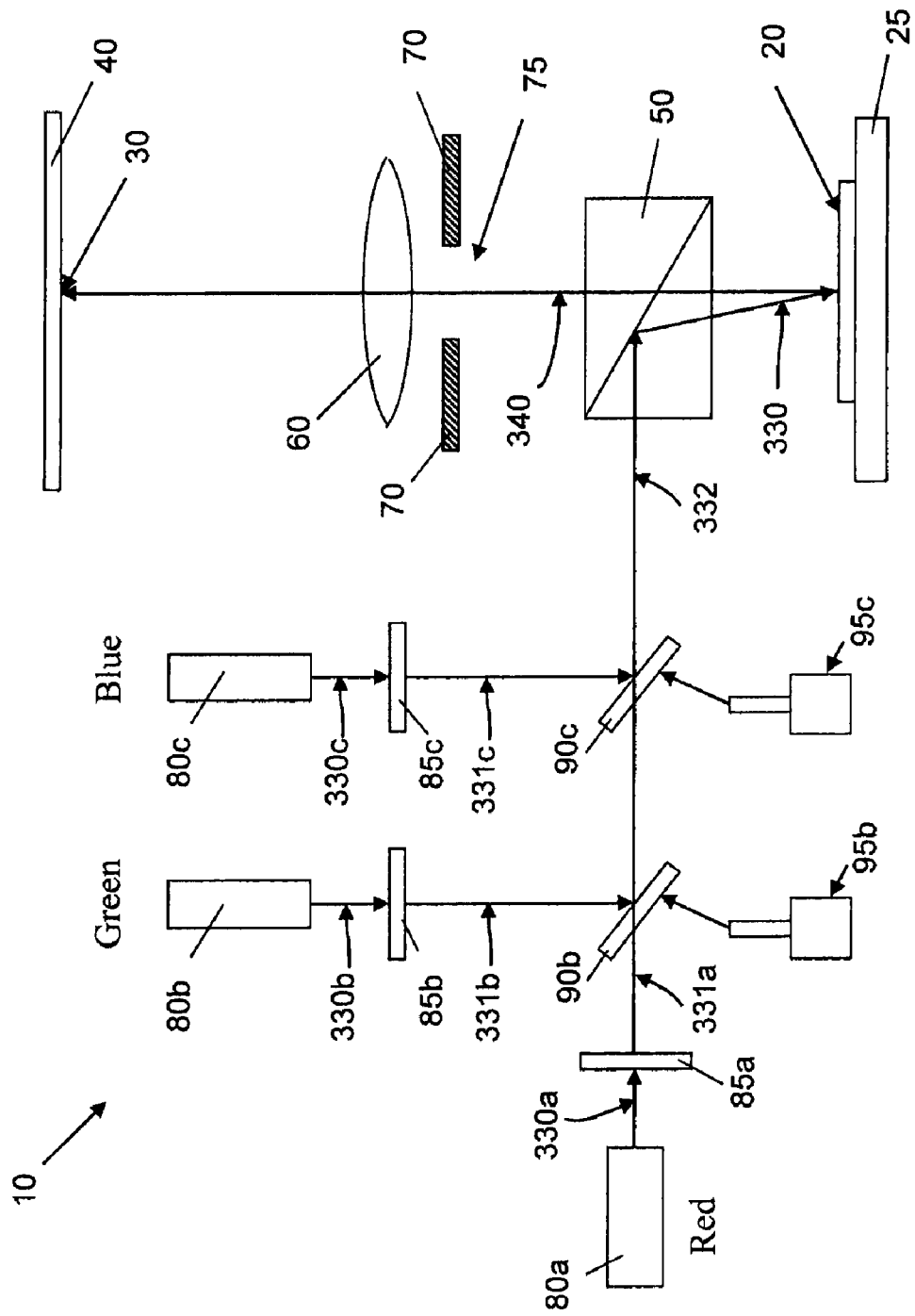
FIG. 1 is a schematic diagram of an exemplified display system including a coherent light source and a de-speckling device.

Referring to FIG. 1, a display system 10 includes a spatial light modulator 20 on a support member 25, a total internal reflection (TIR) prism 50, an opaque aperture structure 70 having an opening 75, and a projection system 60. The display system also includes one or more coherent light sources such as red, green, and blue light sources 80a, 80b and 80c, diffusers 85a, 85b, 85c, and dichroic mirrors 90b and 90c. Examples of the red, green, and blue light sources 80a, 80b and 80c include solid-state semiconductor lasers, diode pumped lasers, and ion or gas laser devices. The red, green, and blue light sources 80a, 80b and 80c can sequentially emit coherent red, green, and blue light beams 330a, 330b, and 330c to illuminate the spatial light modulator 20. The sequentially emitted red, green, and blue colored light 330a, 330b, and 330c respectively pass through diffusers 85a, 85b, and 85c to form colored light 331a, 331b, and 331c. The diffusers 85a, 85b, and 85c are configured to resize (e.g., expand) and shape the cross-sections of the light beams 330a, 330b, and 330c to be compatible with the shape of the spatial light modulator 20. For example, for a rectangular shaped spatial light modulator 20, the colored light 331a, 331b, and 331c can be shaped by the diffusers 85a, 85b, 85c to have rectangular cross-sections, which can be compatible with the spatial light modulator 20.

The colored lights 331b and 331c are respectively reflected by dichroic mirrors 90b, and 90c. The dichroic mirrors 90b and 90c also function as beam combiners, which merge colored lights 331b and 331c into color light 332 along a common optical path. The colored light 331a passes through the dichroic mirror 90b, and then travels along the same optical path as the colored light 331b, 331c after the colored light 331b, 331c are redirected. The color light 332 represents one of the colored lights 331a, 331b, or 331c at each time because the colored lights 330a, 330b, or 330c are sequentially emitted. The color light 332 is reflected by the TIR prism 50 to form color incident light 330, which illuminates micro mirrors in the spatial light modulator 20. The color incident light 330 is selectively reflected by the spatial light modulator 20 to form a reflected light beam 340 which passes through the TIR prism 50 and the opening 75 in the aperture structure 70. When the red colored light 330a is emitted, the colored light 331a and the color incident light 330 are red. The reflected light beam 340 is then projected by the projection system 60 to form a red image on a screen surface 40. Similarly, when the green and blue colored lights 330b, 330c are respectively emitted, the color incident light 330 is respectively green and blue. The reflected light beam 340 is projected by the projection system 60 to respectively form a green and blue image on a screen surface 40. The red, green, and blue display images in combination can produce the visual effect of a color display image that includes a display pixel 30.

The display system 10 includes a transport mechanism 95c that is capable of producing small movements in the dichroic mirror 90c. The transport mechanism 95c can, for example, be an electromagnetic motor or a piezoelectric actuator. The small movement can be chosen to be translational with a magnitude more than half of the wavelength of the colored light 331a, 331b, or 331c. For example, the magnitude of the movement can range from one to 100 times of the wavelengths of the colored light 331a, 331b, or 331c. In another example, the magnitude of the movement in the dichroic mirror 90c can be in a range from 1 to 100 microns, or in a range between 1 and 10 microns. The movement can be periodic. The frequency of the movement is controlled to be higher than the frame rate of the display system. For example, for a video refresh rate of 60 Hz in the display system 10, the frequency of the movement is controlled to be higher than 60 Hz or 1 KHz, such as between 1 kHz and 10 MHz. The frequency of the movement can be twenty to one hundred thousand times the refresh rate.

Figure 2:
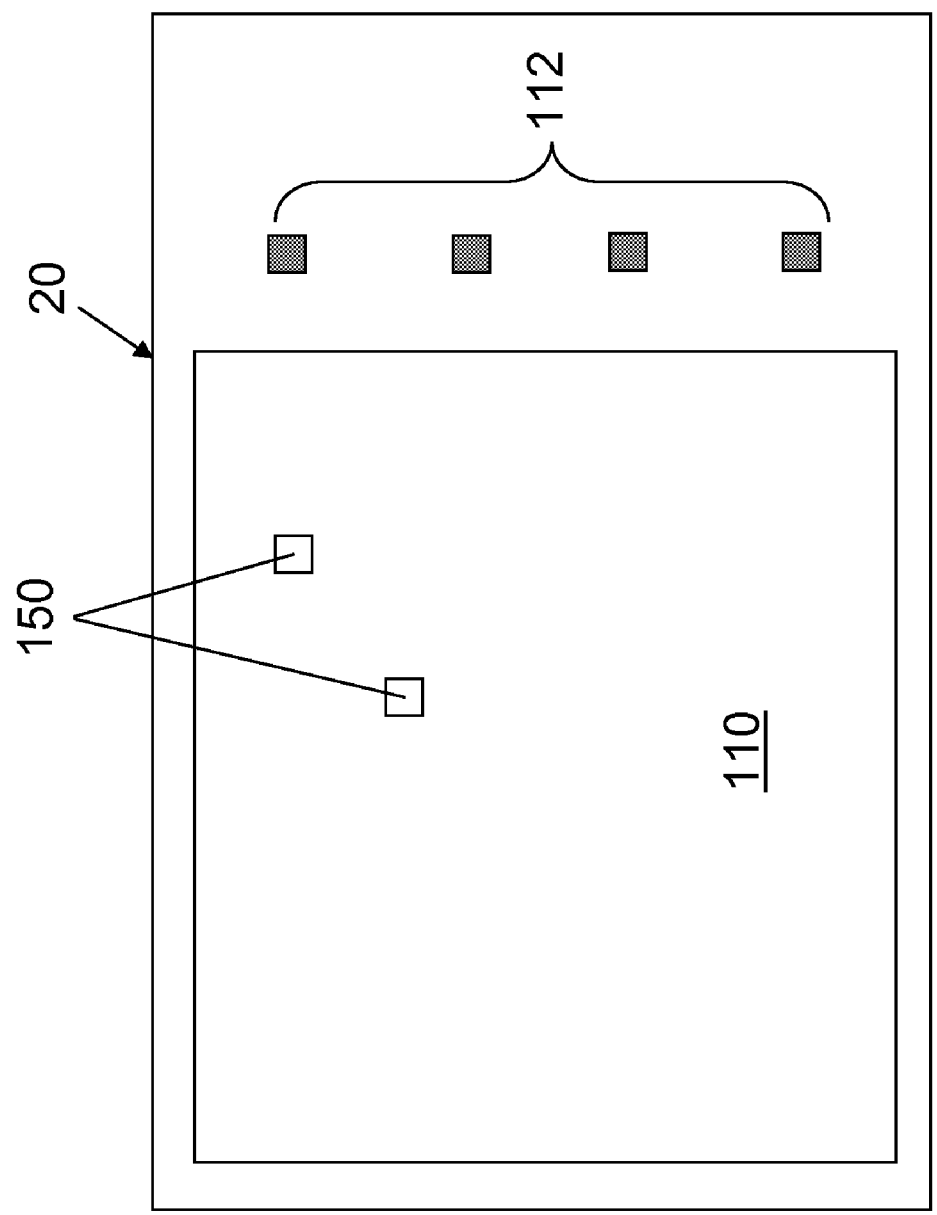
FIG. 2 is a schematic top view of a spatial light modulator compatible with the display system of FIG. 1.
Figure 3:
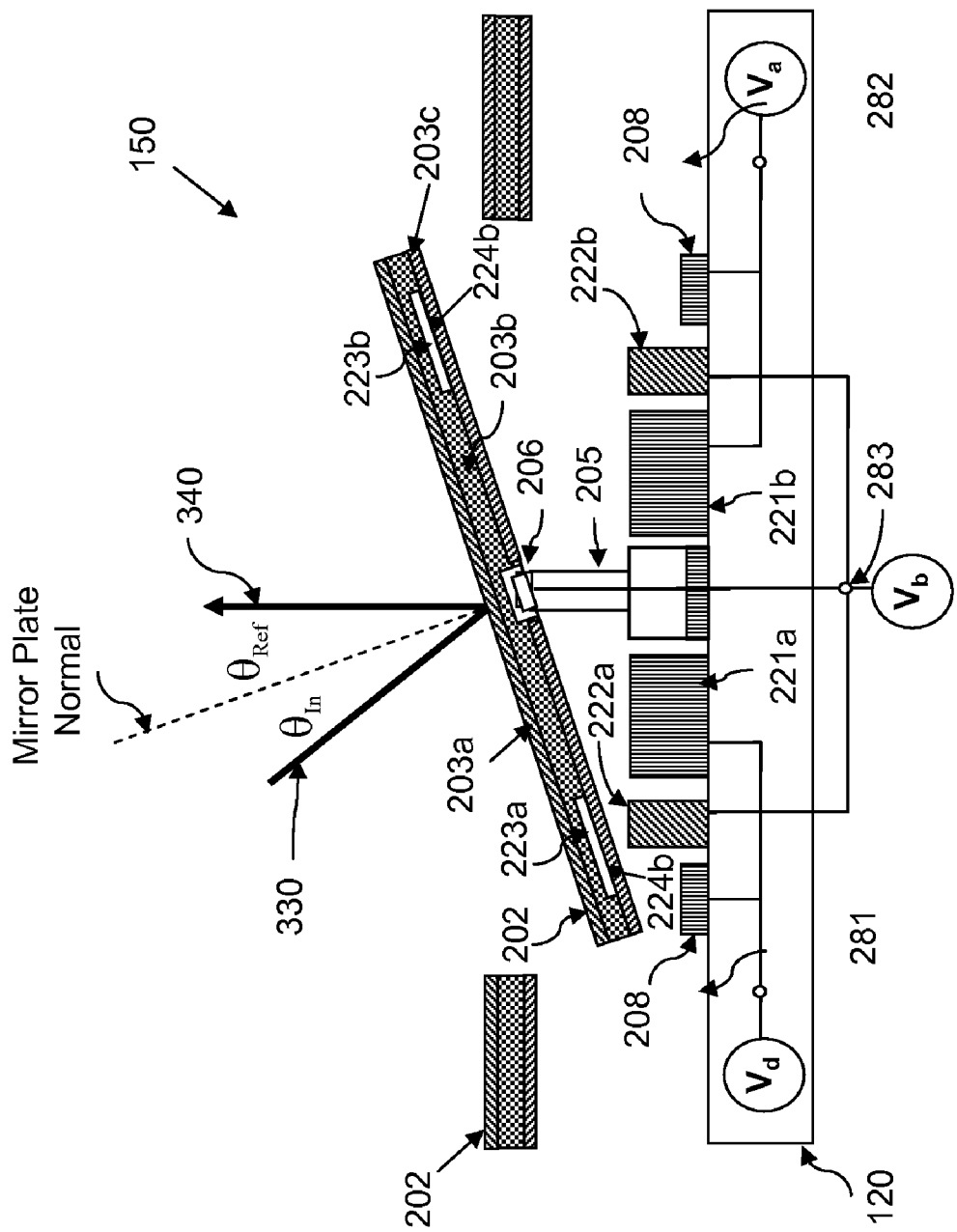
FIG. 3 is a cross-sectional view of an exemplary micro mirror in the spatial light modulator of FIG. 2.

Referring to FIGS. 2 and 3, the spatial light modulator 20 includes an array 110 of pixel cells 150. A pixel cell 150 includes a mirror plate 202 that includes a flat reflective upper layer 203a, a middle layer 203b that provides the mechanical strength for the mirror plate, and a bottom layer 203c. The upper layer 203a can be formed of a reflective material such as aluminum, silver, or gold. The upper layer thickness can be in the range of between about 200 and 1000 angstroms, such as about 600 angstroms. The middle layer 203b can be made of any material, such as a silicon based material, for example, amorphous silicon, a metal or an alloy, typically about 2000 to 5000 angstroms in thickness. The bottom layer 203c can be made of an electrically conductive material that allows the electric potential of the bottom layer 203c to be controlled relative to step electrodes 221a or 221b. The bottom layer 203c can be made of titanium or titanium alloy or other metallic alloy and have a thickness in the range of about 200 to 1000 angstroms.

A hinge 206 is connected with the bottom layer 203c (the connections are out of plane of view and are thus not shown in FIG. 3). The hinge 206 is supported by a hinge post 205 that is rigidly connected to the substrate 120. The mirror plate 202 can include two hinges 206 connected to the bottom layer 203c of the mirror plate. The two hinges 206 define a rotational axis about which the mirror plate 202 is able to tilt. The hinges 206 extend into cavities in the lower portion of mirror plate 202. For ease of manufacturing, the hinge 206 can be fabricated as part of the bottom layer 203c.

Step electrodes 221a and 221b, landing tips 222a and 222b, and a support frame 208 are also fabricated over the substrate 120. The heights of the step electrodes 221a and 221b can be in the range from between about 0.05 microns and 3 microns. The step electrode 221a is electrically connected to an electrode 281 with a voltage Vd that is externally controlled. Similarly, the step electrode 221b is electrically connected with an electrode 282 with a voltage Va that can also be externally controlled. The electric potential of the bottom layer 203c of the mirror plate 202 can be controlled by an electrode 283 at potential Vb. Electric pulses applied to the electrodes 281, 282, and 283 create electric potential differences between the bottom layer 203c on the mirror plate 202 and the step electrodes 221a or 221b and produce electrostatic forces on the mirror plate 202. An imbalance between the electrostatic forces on the two sides of the mirror plate 202 causes the mirror plate 202 to tilt from one orientation to another. The landing tips 222a and 222b are configured to stop the mirror plate's 202 tilt movement at a precise angle. The landing tips 222a and 222b are able to store elastic strain energy when they are deformed by electrostatic forces. The elastic strain energy can be converted to kinetic energy to push away the mirror plate 202 when the electrostatic forces are removed. The push-back on the mirror plate 202 can help separate the mirror plate 202 and the landing tips 222a and 222b. In some embodiments, the middle layer 203b includes cavities 223a and 223b over which the bottom layer 203c forms membranes 224a and 224b. The membranes 224a and 224 are situated above the landing tips 222a and 222b so that when the mirror tilts, the membranes 224a and 224b contact the landing tips 222a and 222b. Similar to the landing tips 222a and 222b, the membranes 224a or 224b can also store elastic energy when the mirror plate 202 is tilted to contact the landing tip 222a or 222b under electrostatic forces. The elastic energy stored in the membranes 224a or 224b can facilitate separating the mirror plate 202 from the landing tip 222a or 222b when the electrostatic forces are removed. In some embodiments, the landing tips 222a and 222b are electrically connected to the hinge post 205 and to the electrodes 283 so that there is no potential difference between the landing tips and bottom layer 203c of the mirror plate 202 when these members come into mechanical contact. Alternatively, the micro mirror can be formed without landing tips 222a and 222b. Such devices without landing tips can include a cantilever spring, bridge spring or hinge layer connected to the mirror with stitches.

The electrodes 281, 282, 283 are electrically connected to electrical pads 112 adjacent to the array 110 of pixels 150. In operation the electrical pads 112 can receive control electrical signals from a control circuit. The control electrical signals can individually address pixel cells 150 and produce electrostatic forces on the mirror plate 202 to tilt the mirror plate 202 to an "on" position and an "off" position. When the mirror plate 202 is at an "on" position, as shown in FIG. 3, the color incident light 330 forms an incident angle $\theta_{In}$ relative to the normal direction of the mirror plate 202. The reflected light beam 340 forms a reflective angle $\theta_{Ref}$ of equal value relative to the normal of the mirror plate 202. The directions of the color incident light 330 and the reflected light beam 340, and the orientation of the mirror plate at the "on" position can be arranged so that the reflected light beam 340 is substantially vertical to the top surface of the substrate 120. When the mirror plate 202 is tilted to reflect light in the "off" position, the light is directed away from a screen surface, such as to an absorbing surface or sufficiently far enough away from the light directed in the "on" position to cause little to no interference. Thus, at any one moment in time, neighboring pixels on the screen surface can be "on" or "off", depending on the orientation of mirror plates in the array 110.

Without the small movements produced by the movement of the dichroic mirror 90c, referring now to FIGS. 1-3, the color light 332, the color incident light 330, and the reflected light beam 340 travel in phase along fixed optical paths. The coherence in the reflected light beam 340 creates undesirable static or slow changing coherence patterns (i.e., a "salt and pepper pattern") in the display image on the screen surface 40. The movements in the dichroic mirror 90c result in a small lateral shift in the color light 332 before and after the reflection by the TIR prism 50. The dimensions of color incident light 330 are wider than the widths of the spatial light modulator 20 such that the pixel cells (150 in FIG. 2) are always properly illuminated during the lateral shift in the color light 332. The lateral movement of the color light 332 does not change the propagation direction of the color incident light 330. The incident angle $\theta_{In}$ is thus unchanged by the lateral movement of the color incident light 330. As the color light 332 is shifted over time, different portions of the color incident light 330 come to illuminate a particular mirror plate 202 in a pixel cell 150. Since the different portions of the coherent color incident light 330 have different coherent phase, the speckle pattern produced by the reflected light beam 340 on the screen surface 40 shifts in accordance to the lateral movements in the color light 332. Since the movement of the color light 332 and the color incident light 330 has a frequency higher than the video frame rate, the shifted speckle patterns on the screen surface 40 are averaged out within the time period of a video frame. The visual effects of the "salt and pepper" speckle patterns can be reduced or eliminated.

In some embodiments, the display system 10 includes a transport mechanism 95b capable of producing small movement in the dichroic mirror 90c. The small movements in the dichroic mirror 90c can shift the coherent colored light 331a, 331b, which can shift and average out the red, green and blue speckle patterns on the screen surface 40. The visual effect of the red, green and blue speckle patterns can thus be reduced or eliminated. The actuator 95b is optional in the system, so long as at least one actuator is included in the system.

Figure 4:
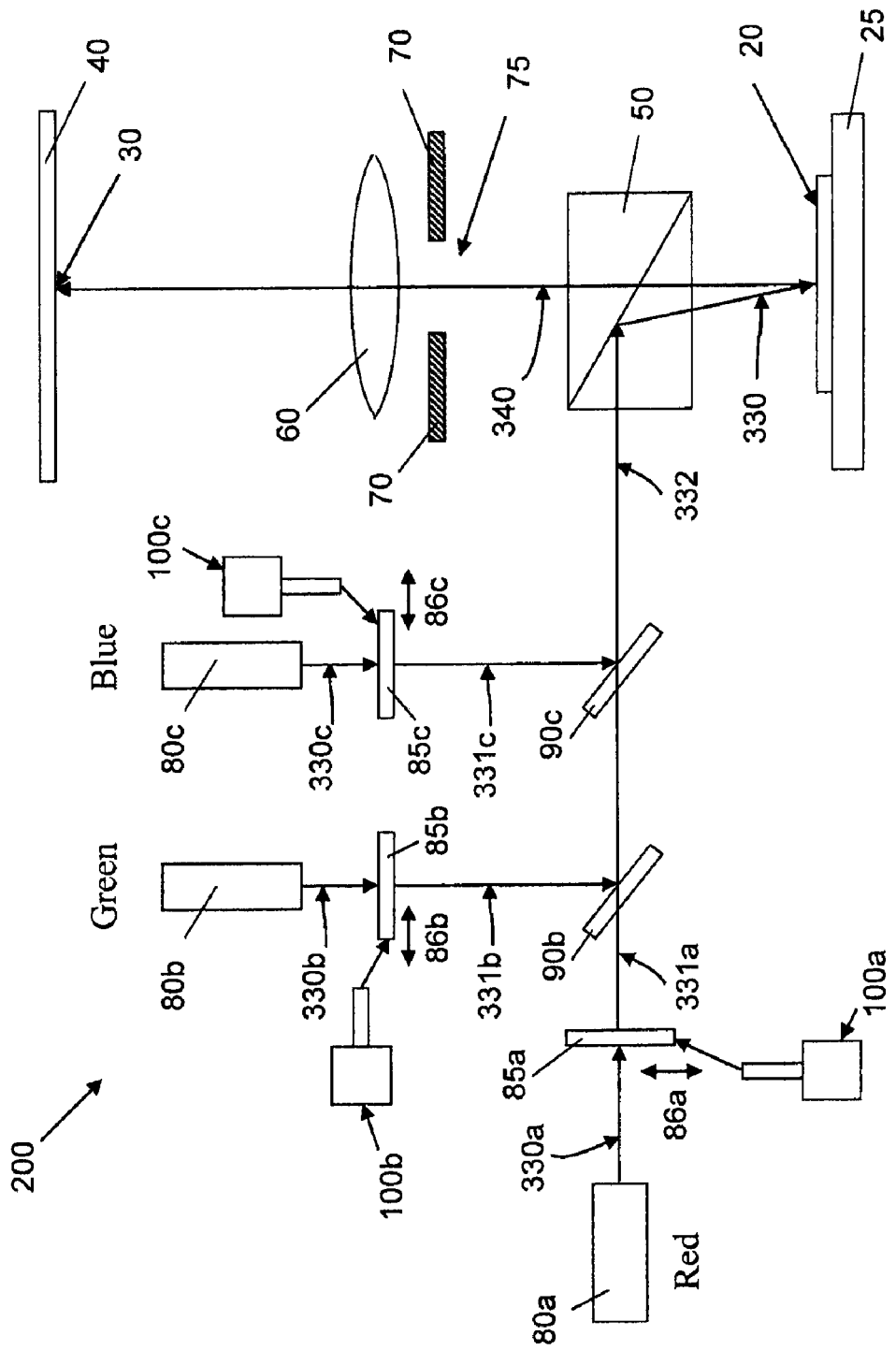
FIG. 4 is a schematic diagram of another exemplified display system including a coherent light source and a de-speckling device.

In some embodiments, as shown in FIG. 4, a display system 200 can include transport mechanisms 100a, 100b, 100c that can produce small movements in the diffusers 85a, 85b, 85c in the directions 86a, 86b, and 86c respectively. Similar to the transport mechanism 95b and 95c, as described above, the transport mechanisms 100a, 100b, 100c can be an electromagnetic motor or a piezoelectric actuator. The small movement can have magnitudes more than half of the wavelength of the colored light 331a, 331b, or 331c, respectively.

In some embodiments, a transmissive optical element is placed in the path of beam 332. A surface acoustic wave is generated on the surface of the transmissive optical element, which scrambles the phase of coherent light falling onto the optical element. The transmissive optical element can be used in place of the actuator and transport mechanisms described herein and the transmissive optical element can decrease or eliminate the speckle on the screen surface 40.

Figure 5:
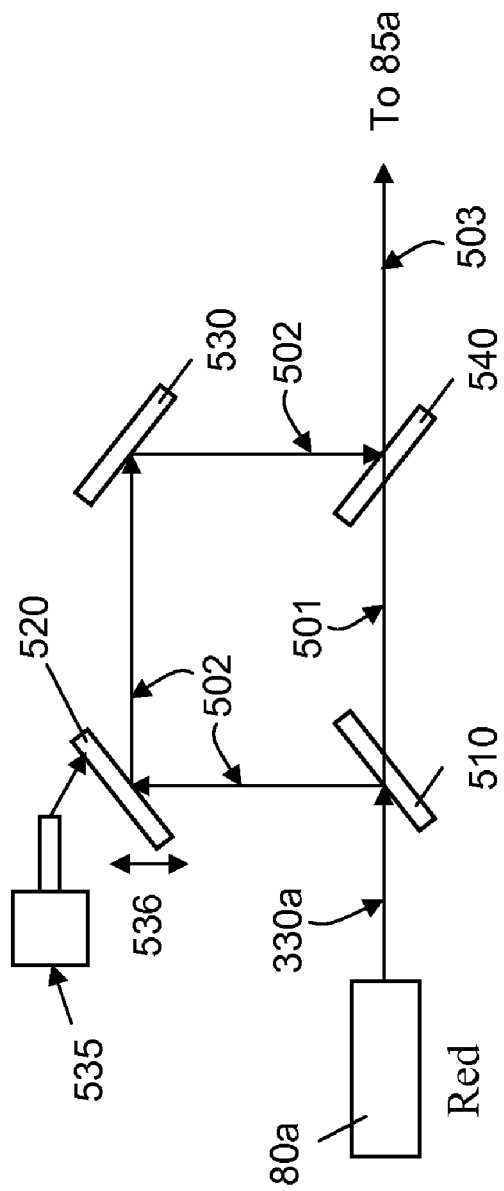
FIG. 5 is a schematic diagram of an exemplified arrangement for producing a coherent light beam to reduce speckling in a display system.

In some embodiments, referring to FIG. 5, a coherent red light beam 330a emitted by a red light source 80a can be split into sub-beams 501 and 502 by a dichroic mirror 510. The sub-beam 502 is reflected by mirrors 520 and 530. The sub-beams 501 and 502 are then merged by a beam combiner 540 to form a recombined light beam 503. A transport system 535 can move the mirror 520 in a direction 536 in a small magnitude, similar to described above. The sub-beam 502 is thus moved in a small magnitude before it is recombined with the sub-beam 501. In some embodiments, the sub-beam 501 can also be moved by a different mechanism. The movement in a portion of the coherent light beam 330a can reduce the coherent pattern in the light beam 503, which can help reduce speckling in the display image in a display system.

The above described arrangements for reducing speckling can be used in combination. Different optical components such as dichroic mirrors, diffusers, lenses, and mirrors can be moved in a display system to reduce speckling in the display image. For example, the configuration shown in FIG. 5 is compatible with display systems 10 or 200. The movements of the different optical components are preferably in different phases and at different frequencies.

The disclosed systems and methods can improve the viewing quality of display images produced by display systems using coherent light sources. Furthermore, disclosed systems and methods are generally applicable instead of limited to a specific type of spatial light modulator. The systems that are described herein are digital systems that can use software instructions to dictate the length of time each pixel is displayed on the screen and therefore can control the grayscale that is perceived by a viewer. In some embodiments, the amount of light on a display at a pixel when the pixel is on is consistently the same and is not variable. In some embodiments, the amount of light at a pixel when the pixel is on is selectable between one, two or three or a large number of predetermined and levels and is not infinitely selectable between a range of values.

It is understood that the disclosed systems and methods are compatible with other configurations of spatial light modulators such as reflective liquid crystal devices. In addition, the despeckling techniques described herein can be used with other types of spatial light modulators, such as liquid crystal displays or liquid crystal on silicon displays. Moreover, the movement produced by the transport mechanism can also include a rotation or a combination of translation and rotation. The disclosed display system can include transport mechanisms to produce a small movement in other optical components such as a reflective mirror and a lens to reduce the speckle pattern in a display image produced by a coherent light source. For example, the TIR prism can be moved to reduce the speckle pattern.

What is claimed is:

1. A display system, comprising:
a coherent light source configured to emit a coherent light beam;
a first optical component configured to split the coherent light beam into a first sub-beam and a second sub-beam;
a second optical component configured to combine the first sub-beam and the second sub-beam to form a recombined coherent light beam to be directed to a spatial light modulator;
a third optical component configured to direct the second sub-beam from the first optical component to the second optical component;
a transport mechanism configured to move the third optical component to produce a movement in the second sub-beam; and
a spatial light modulator having a two-dimensional array of mirrors each configured to selectively reflect the recombined coherent light beam either toward a screen surface or away from the screen surface to form a display pixel on the screen surface, wherein a display image is formed on the screen surface by display pixels produced by the mirrors that reflect the recombined coherent light beam toward the screen surface.

* * * * *